United States Patent [19]

Gu et al.

[11] 4,435,839

[45] Mar. 6, 1984

[54] FOIL BEARING RUBBING SURFACE COATING APPLICATION METHODS

[75] Inventors: Alston L. Gu, Huntington Beach; Alexander Silver, Tarzana, both of Calif.

[73] Assignee: The Garrett Corporation, Los Angeles, Calif.

[21] Appl. No.: 420,663

[22] Filed: Sep. 21, 1982

[51] Int. Cl.³ .................. F16C 1/24; F16C 33/00; B05D 3/02; B05D 3/12

[52] U.S. Cl. ............................ 384/103; 308/241; 308/DIG. 9; 29/149.5 R; 29/149.5 NM; 252/12; 252/12.2; 252/29; 427/355; 427/379

[58] Field of Search ............ 252/29, 47, 47.5, 46.3, 252/12, 12.2; 427/355, 368, 379; 384/103; 308/5 R, 241, DIG. 1, DIG. 9; 29/149.5 R, 149.5 NM

[56] References Cited

U.S. PATENT DOCUMENTS 3,677,612 7/1972 Barnett et al. ............... 384/103 X
3,776,845 12/1973 Watanabe et al. ................ 252/12
3,856,686 12/1974 Sato et al. ..................... 252/29 X
4,005,914 2/1977 Newman ......................... 384/103

FOREIGN PATENT DOCUMENTS 821954 10/1959 United Kingdom .

Primary Examiner—Michael R. Lusignan
Attorney, Agent, or Firm—J. Richard Konneker; Albert J. Miller

[57] ABSTRACT

A specially designed method is used to apply a graphite fluoride (CFx)-polyimide binder dry lubricant coating to the rubbing contact surface of a foil element used in a high speed gas foil bearing.

29 Claims, 3 Drawing Figures

U.S. Patent   Mar. 6, 1984   4,435,839
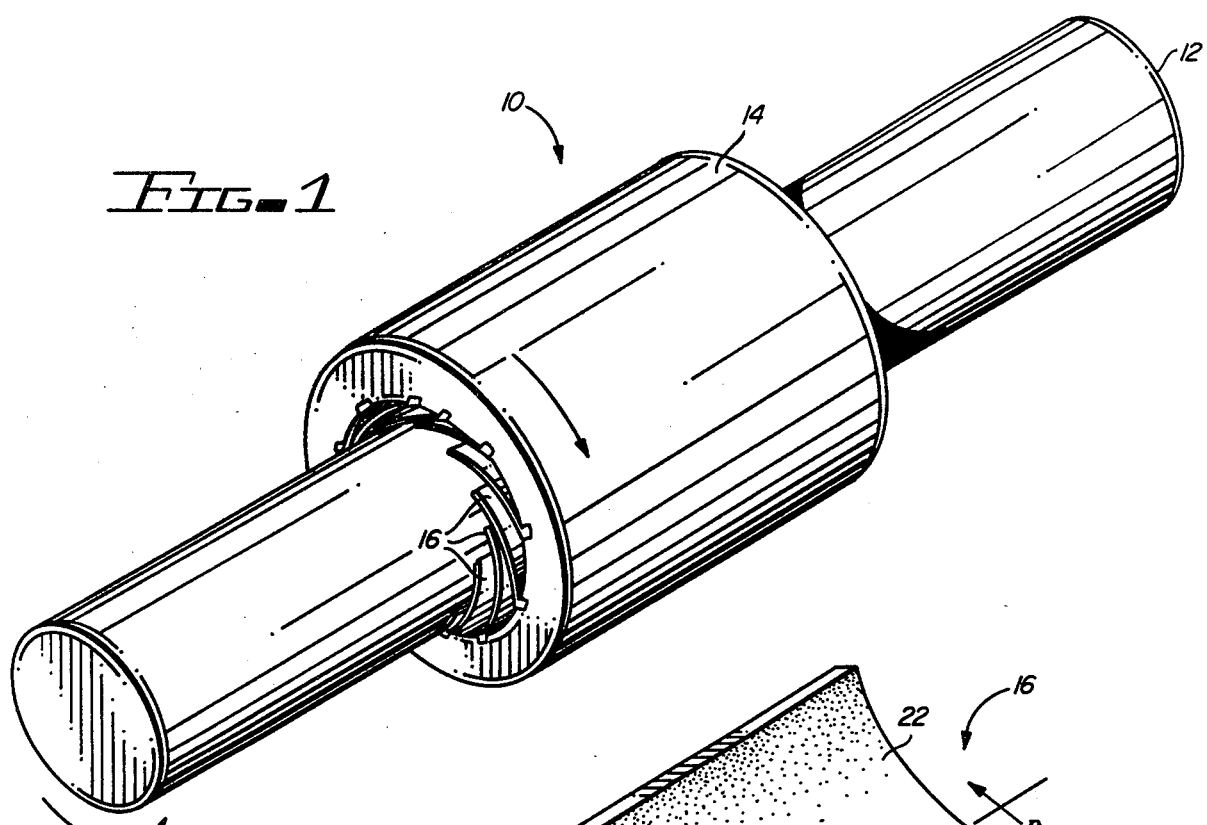
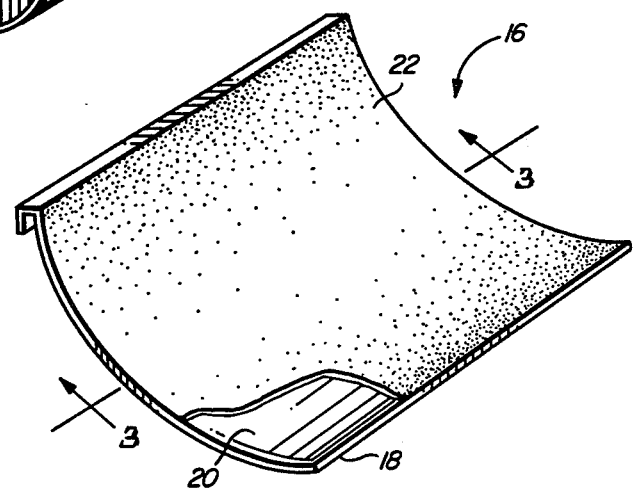
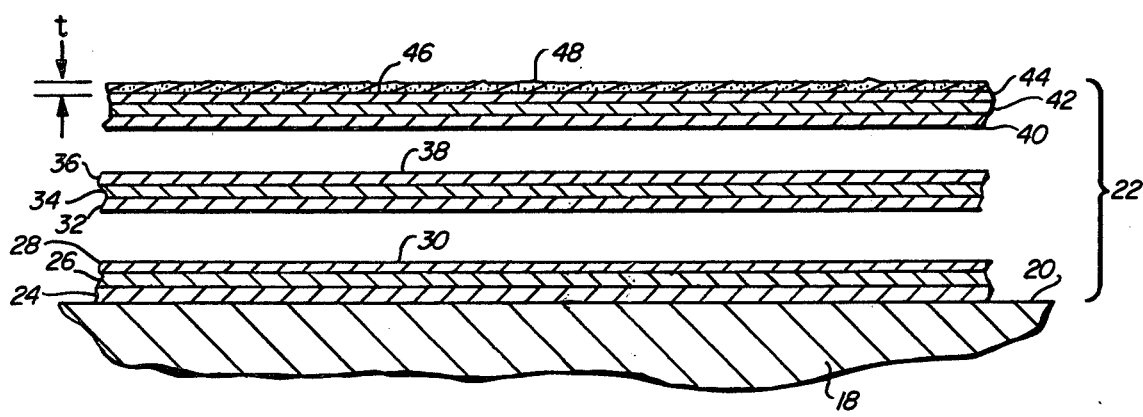

FOIL BEARING RUBBING SURFACE COATING APPLICATION METHODS

BACKGROUND OF THE INVENTION

The present invention relates generally to process fluid or gas bearings, and more particularly provides a novel method of applying a dry lubricant coating to the rubbing contact surface of a foil element used in a high speed gas foil bearing.

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting fluid "wedge" which prevents contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capacity. While these externally pressurized or hydrostatic fluid bearings do increase the load carrying capacity, they do introduce the requirement for an external source of clean fluid under pressure.

Illustrative of hyrodynamic and/or hydrostatic bearing patents assigned to the same Assignee of this application are U.S. Pat. Nos.: 3,215,479; 3,215,480; 3,366,427; 3,375,046; 3,382,014; 3,434,762; 3,467,451; 3,511,544; 3,560,064; 3,615,121; 3,635,534; 3,642,331; 3,677,612 and 3,893,733.

In the operation of these fluid film foil bearings, at startup and rundown and in some cases even at higher speeds, there is actual rubbing contact between the foils and the bearing surfaces with respect to which there is relative movement. This may be between the foils and a shaft or bushing or, in the case of thrust bearings, with respect to a thrust plate or runner. In any case there may also be rubbing contact where individual foils or foil stiffener elements overlap.

In order to lower the startup friction and prevent wear or galling at these contact or rubbing surfaces, wherever they may be, the foils, usually a thin compliant metallic material, are often uniformly coated with a dry lubricating material which is generally softer than the contacting surface. The lubricant material may be of one kind or a mixture of such substances as fluorinated hydrocarbon polymer, graphite, or molybdenum disulfide, all of which are characteristically difficult to make adhere to any metal substrate. Usually they are mixed with a binder to produce better adhesion and other substances to increase their hardness, temperature, and wear resistance. In addition, the foil surface may be etched by various methods such as acid dipping or grit blasting or the coating may be applied by plasma spray or ion deposition means. Sometimes a primer coating with lesser lubricating qualities is applied first. Examples of patents specifically directed to foil coatings are U.S. Pat. Nos. 3,677,612 and 4,005,914 and British Pat. No. 821,954. U.S. Pat. application Ser. No. 33,931, filed Apr. 27, 1979, now abandoned, entitled "Foil Bearing Surface and Method of Making Same" and assigned to the same Assignee as this application is another example.

While these foil bearing rubbing surface coatings have improved bearing wear performance, higher operating temperature requirements now require improved coatings which can survive these higher operating temperatures. Foil element lubricant coatings simply must have higher temperature capabilities if the use of foil bearings is to continue to expand into higher temperature operating environments.

A dry lubricant material which has demonstrated increased operating temperature capabilities in relatively low speed conventional bearing test applications is graphite fluoride ($CF_x$), a solid lubricant which is prepared by the direct chemical combination of graphite powder and fluorine gas under carefully controlled conditions.

Although attempts have been made to apply $CF_x$ powder directly to bearing rubbing contact surfaces (i.e., by burnishing techniques), a somewhat better approach has been to mix the powder with a liquid binder such as polyimide resin. The $CF_x$-binder mixture is then applied to the particular bearing surface and cured to form a dry lubricant film on such surface. A conventional method of forming this type of dry lubricant film on a bearing element substrate is set forth in the 1972 National Aeronautics and Space Administration Technical Note NASA TN D-6714 entitled "Graphite Fluoride as a Solid Lubricant in a Polyimide Binder'".

Despite the demonstrated high temperature lubricating capabilities of conventionally applied $CF_x$-polyimide binder films in low speed applications, they would be wholly unsatisfactory as lubricant coatings for the compliant foil members in foil bearings which are commonly operated at rotational speeds well in excess of 100,000 RPM. This unsuitability stems from the failure of conventional application techniques to afford the resulting dry lubricant film a satisfactorily uniform thickness and sufficiently smooth rubbing contact surface across the length and breadth of the foil element.

Lacking the requisite high degree of surface smoothness and thickness uniformity, conventionally applied $CF_x$-binder dry lubricant films would exhibit only very limited, and thus unacceptable, life spans in foil bearing applications. Specifically, such films would rather quickly begin to deteriorate if exposed to the high temperature and speed environment characteristic of gas foil bearings.

Accordingly, it is an object of the present invention to eliminate or minimize above-mentioned and other problems by providing an improved method of applying a CFx-binder dry lubricant coating to a gas foil bearing element.

SUMMARY OF THE INVENTION

In carrying out principles of the present invention, in accordance with a preferred embodiment thereof, a multi-layered coating of a CFx-polyimide binder mixture is applied to the cleaned, slightly roughened rubbing contact surface of a compliant bearing foil element. After the application of each successive subcoat the foil element is placed in a curing oven set at between approximately 225° F. and 275° F. and cured for approximately one hour. To provide the requisite high degree of surface smoothness and thickness uniformity in the finished coating, the outer coating surface is deroughened at predetermined thickness intervals during the layer-by-layer buildup of the overall coating. This intermediate deroughening is preferably carried out after approximately one third and two thirds of the total subcoats have been applied and cured.

The total number of subcoats is selected to make the total coating thickness slightly thicker than the desired finished coating thickness after the final subcoat has been cured. When the final subcoat has been cured, and the desired initial overthickness of the coating verified, the coated foil element is placed in a curing oven which has been preheated to 212° F. The oven control is then reset to a final cure temperature of between approximately 650° F. and 750° F.

When the final cure temperature is reached, the coated foil is cured for approximately one hour, then removed from the oven and allowed to cool. A small amount of CFx powder is then burnished into the final subcoat and the coating is sanded down to its final thickness.

BRIEF DESCRIPTION OF THE DRAWINGS

FIG. 1 is a perspective view of a representative foil journal bearing whose foil element rubbing surfaces are coated with a CFx-binder dry lubricant coating applied thereto by a method of the present invention;

FIG. 2 is a greatly enlarged perspective view of one of the coated foil elements of the bearing with a portion of the surface coating being broken away for illustrative purposes; and FIG. 3 is a greatly enlarged, partially exploded fragmentary cross-sectional view taken through the coated foil element along line 3—3 of FIG. 2.

DETAILED DESCRIPTION

Illustrated in FIG. 1 is a foil journal bearing 10 in which principles of the present invention are incorporated. The bearing comprises a shaft 12 which extends axially through a somewhat larger diameter opening in a cylindrical bushing or journal 14. Disposed in the space between the shaft and bushing, and carried by the bushing 14, are a plurality of overlapping bearing foils 16. Arrows on the end of the shaft 12 and the exterior of the bushing 14 indicate the direction of relative rotation between the shaft and bushing. It is not necessary that both the shaft and the bushing rotate. Either the shaft or the bushing may be stationary. It is only necessary that the relative rotation between the shaft and the bushing be in the direction indicated.

One of the bearing foils 16 is depicted in FIG. 2 and includes a thin, compliant metal foil member 18 having a rubbing contact surface 20 which, in the assembled bearing 10, faces the shaft 12. Rubbing contact surface 20 is coated with a 0.001" thick graphite fluoride (CFx)—polyimide binder dry lubricant film 22 which serves to decrease the friction between the shaft 12 and the bearing foils 16 when the shaft and foils 12, 16 come into rubbing contact during startup, rundown and intermittent periods of normal operation of the bearing 10.

Despite their ability to withstand fairly high temperatures in conventional low speed bearing applications, conventionally applied CFx-binder coatings would not be suitable in the high speed-high temperature applications in which foil bearings are utilized with increasing frequency. Specifically, when exposed to common foil bearing rotational speeds in excess of 100,000 RPM, and to accompanying high operating temperatures, such conventionally applied CFx-binder coatings would have only very limited and decidedly unsuitable life spans. This is due to the fact that previously known methods of coating the rubbing surfaces of bearing foil members with CFx-binder dry lubricant films have failed to provide such films with the requisite high degree of thickness uniformity and surface smoothness. Lacking these essential characteristics of a high speed foil member coating, conventionally applied CFx-binder films would be subject to rapid deterioration in typical high speed, high temperature foil bearing applications.

The present invention solves these problems by providing a unique method for applying a CFx-binder dry lubricant coating to the rubbing contact surface of a bearing foil element. The resulting coating has a greatly improved surface smoothness and thickness uniformity, thus substantially increasing its operating life and rendering it suitable for use in high speed foil bearings such as the representative bearing 10.

Utilizing the method which represents a preferred embodiment of the present invention, the rubbing contact surface 20 (FIG. 3) of the compliant metal foil element 18 is first roughened by sanding it in two perpendicular directions with 280-320 grit sandpaper. The roughened surface 20 is then washed with alcohol to remove grit particles. Next, a paste of 3 to 5 micron aluminum oxide (levigated alumina) and distilled water is made and used to scrub the surface 20 one or more times until the surface is thoroughly "wettable" when rinsed under running water. When this wettability characteristic is achieved, the surface 20 is given a final rinse with distilled water and allowed to dry. To maintain the now coating-ready surface 20 in proper condition until the actual coating process is initiated, the foil member 18 is stored in a clean plastic wrap.

The liquid coating which is applied to the cleaned and roughened surface 20 in a manner subsequently described comprises a mixture of:

1. CFx powder (with "x", the fluoride-to-graphite mole weight ratio, being approximately 1.0);

2. A polyimide binder liquid (such as P4701 polyimide varnish manufactured by Dupont);

3. An N-methylpyrrolidone and xylene thinning liquid (such as T8585 thinner manufactured by Dupont); and 4. A suitable fluorocarbon solution wetting agent (such as FC-430 manufactured by the 3M Company) for reducing the surface tension of the mixture and thereby improving the overall smoothness of the finished lubricant coating.

The above mixture is formed in the proper component ratio by first measuring both the weight and the volume of a starting quantity of the polyimide varnish.

Next, a quantity of the thinner having three times the volume of the varnish is mixed therewith. To this submixture is added a quantity of the CFx powder having a weight equal to 0.43 the weight of the varnish in the submixture. Finally, a very small quantity of the wetting agent is added.

The mixture is then thoroughly agitated and transferred to appropriate spray apparatus, such as an air brush mechanism, powered by gaseous nitrogen ($GN_2$) or other clean gaseous propellant. The application process is begun by spraying a first even subcoat 24 (FIG. 3) onto the rubbing contact surface 20. After subcoat 24 has been applied to the surface 20, the subcoat is cured for approximately one hour in an oven which has been preheated to an initial cure temperature of between approximately 225° F. and 275° F. to thereby solidify the subcoat. In this same manner second and third subcoats 26, 28 of the CFx-binder mixture are successively applied and cured. It should be noted that the mixture should be frequently agitated to assure that the CFx powder is kept in colloidal suspension during the actual spraying process.

When the third subcoat 28 has been cured in the manner described, the upper surface 30 (FIG. 3) of subcoat 28 is lightly sanded with 600 grit sandpaper that has been sanded against itself to remove sharpness and then blown clean with $GN_2$ to remove loose particles. The sanded surface 30 is then blown clean with $GN_2$ or, alternatively, washed with distilled water and then dried for 15 minutes at 212° F.

Next, a second set of three subcoats 32, 34, 36 of the CFx-binder mixture is applied to the coating surface 30, each of these three subcoats, in succession, being cured at the initial 225° F.–275° F. cure temperature for approximately one hour. After subcoat 36 is cured, its upper surface 38 is sanded and cleaned in the same manner as surface 30.

Finally, a third set of subcoats is applied to the surface 38 and successively cured at the initial 225° F.–275° F. cure temperature. The actual number of subcoats in this final coating subset set is selected to render the total thickness of the built-up coating (after the final 212° subcoat cure) approximately 0.0008" greater than the desired total thickness (0.001") of the finished multilayer coating 22. In the lubricant coating 22 depicted in FIG. 3, this final coating subset consists of three subcoats 40, 42 and 44, the last subcoat 44 having an upper surface 46.

After the final subcoat has been cured and the total coating overthickness of approximately 0.0008" has been verified, the coated foil element is placed in a preheated 212° F. oven. The oven control is then reset to a final cure temperature of between approximately 650° F. and 750° F. When the final cure temperature is reached (this temperature elevation requiring from thirty to sixty minutes in conventional curing ovens) the coated foil element is cured at this substantially higher temperature for approximately one hour. The coated foil element is then removed from the curing oven and allowed to cool. The final elevated temperature cure normally reduces the total coating thickness by approximately 0.0005".

To further increase the smoothness and lubricity of the finished surface of coating 22, it is preferable to burnish a small amount of CFx powder 48 into the coating surface 46 of the cooled foil element until surface 46 becomes uniformly shiny. Such burnishing may be conveniently accomplished using a microweave cloth or other essentially lint-free applicator material. The CFx-impregnated surface 46 is then sanded (using pre-sanded 600 grit sandpaper) to remove the coating's small remaining overthickness "t".

By virtue of the previously described application method, the resulting multi-layer coating 22 is afforded a substantially improved thickness uniformity and surface smoothness, thereby uniquely rendering the CFx-binder coating 22 suitable for high temperature-high speed lubrication applications such as in the representative gas foil bearing 10.

Several important features of the application method cooperate in a novel manner to achieve this desirable result. First, as previously described, each of the subcoats is cured at a relatively low first cure temperature before the next subcoat is applied. This progressively and uniformly removes the solvent portion of the CFx-binder mixture across the entire final thickness of the coating 22 without causing cure-related blistering or other unevenness therein.

Secondly, as the coating 22 is being fashioned from its various subcoats it is deroughened at specific thickness or subcoat intervals. In this regard it has been found preferable to use the described thickness interval of one third—i.e., where nine subcoats are required to provide the initial overthickness of approximately 80%, the progressively built-up coating should be deroughened after the third, sixth and final subcoats are applied. (It should also be noted that the final subcoating set, or each of the subsets, may require a slightly greater or lesser number of actual subcoats to achieve this preferred ratio). This deroughening of coating 22 at specific thickness intervals performs the important function of substantially increasing the finished coating's thickness uniformity subsequent to the final cure.

Thirdly, the gradual temperature elevation to the final cure temperature (instead of the conventional curing technique of simply placing the article to be cured in an oven preheated to the desired cure temperature) "sets" the coating 22 without introducing irreparable surface defects (such as blisters) therein or causing undesirable thickness irregularities.

Finally, the introduction of the thin outer layer of CFx powder onto the coating surface 46 prior to the final finishing step further improves the coating's surface smoothness and high temperature lubrication characteristics.

In summary, it can be seen that the present invention provides a method for applying a CFx-binder dry lubrication coating to a rubbing contact surface in a manner permitting the coating to withstand the high speed and temperature environments typically present in gas foil bearing applications, such as the representative journal bearing 10, as well as other types of foil bearings (e.g. conical and thrust bearings).

The foregoing detailed description is to be clearly understood as given by way of illustration and example only, the spirit and scope of this invention being limited solely by the appended claims.

What is claimed is:

1. A method of applying a dry lubricant coating to a rubbing contact surface of a bearing, said method comprising the steps of:
   (a) providing a coating mixture comprising a dry lubricant material and a liquid binder;
   (b) applying a multiplicity of subcoats of said mixture to the rubbing contact surface to form a multilayered lubricant coating thereon;

(c) curing each successive subcoat at a first temperature to individually solidify the subcoats;

(d) deroughening the surfaces of selected ones of the subcoats positioned at predetermined thickness intervals of said multilayered coating; and (e) curing the multilayered coating at a second temperature substantially higher than said first temperature.

2. The method of claim 1 further comprising the step of (f) applying a dry lubricant material upon the surface of the cured multilayered coating.

3. The method of claim 2 wherein said step (d) includes deroughening the surface of the last-applied subcoat, and wherein said step (f) is performed by burnishing a dry lubricant powder into said last-applied subcoat prior to the deroughening of its surface.

4. The method of claim 1 wherein said step (a) is performed by providing a coating mixture comprising graphite fluoride (CFx) powder and polyimide varnish.

5. The method of claim 1 wherein said step (a) is performed by providing a coating mixture comprising graphite fluoride (CFx) powder, polyimide varnish, an N-methylpyrrolidone and xylene thinning liquid, and a fluorocarbon solution wetting agent.

6. The method of claim 1 wherein said step (a) is performed by providing a coating mixture comprising a quantity of polyimide varnish, a quantity of N-methylpyrrolidone and xylene thinning liquid having a volume approximately three times the volume of said quantity of polyimide varnish, a quantity of $CF_{1.0}$ powder having a weight equal to approximately 0.43 times the weight of said quantity of polyimide varnish, and a small quantity of a fluorocarbon solution wetting agent.

7. The method of claim 1 wherein said step (c) is performed by curing said subcoats at an initial cure temperature of approximately 225° F. to approximately 275° F.

8. The method of claim 7 wherein said step (e) includes curing said multilayered coating at a final cure temperature between approximately 650° F. and approximately 750° F.

9. The method of claim 8 wherein said step (e) is performed by exposing said multilayered coating to an initial temperature of approximately 212° F., gradually elevating the curing temperature to said final cure temperature, and then curing the multilayered coating at said final cure temperature for approximately one hour.

10. The method of claim 1 wherein said step (d) is performed by deroughening the surfaces of subcoats positioned at thickness intervals equal to approximately one third the thickness of said multilayered coating.

11. A bearing having a rubbing contact surface coated in accordance with the method of claim 1, 2, 3, 4, 5, 6, 7, 8, 9, or 10.

12. A method of utilizing graphite fluoride (CFx) to lubricate the rubbing contact surface of a foil element in a high speed foil bearing, said method comprising the steps of:

(a) forming a coating mixture comprising CFx powder and a liquid polyimide binder;

(b) applying a multiplicity of subcoats of said mixture to the rubbing contact surface to form a multilayered lubricant coating thereon;

(c) curing each successive subcoat to individually solidify the subcoats;

(d) deroughening the surfaces of selected ones of the subcoats positioned at predetermined thickness intervals of said multilayered coating;

(e) curing the multilayered coating by exposing the same to a relatively low curing temperature, raising the curing temperature to a substantially higher level, and then curing the multilayered coating at the higher temperature for a predetermined length of time;

(f) burnishing CFx powder into the surface of the cured multilayered coating; and (g) deroughening the burnished surface of the cured multilayered coating to reduce the total coating thickness to a predetermined finished thickness.

13. The method of claim 12 wherein said step (d) is performed by deroughening subcoats mutually spaced apart by distances equal to approximately one third of the thickness of said multilayered coating.

14. The method of claim 13 wherein said step (b) is performed by applying approximately nine subcoats of said mixture to the rubbing contact surface.

15. The method of claim 14 wherein said step (g) is performed in a manner reducing the total coating thickness to approximately 0.001".

16. The method of claim 12 wherein said step (e) includes gradually raising said curing temperature from approximately 212° F. to a higher curing temperature between approximately 650° F. and approximately 750° F. and then curing said multilayered coating at the higher temperature for approximately one hour.

17. A foil bearing foil element having a rubbing contact surface coated in accordance with the method of claim 12, 13, 14, 15 or 16.

18. A method of forming a dry lubricant film on the rubbing contact surface of a foil bearing foil element, said method comprising the steps of:

(a) forming a coating mixture comprising CFx powder, polyimide varnish, an N-methylpyrrolidone and xylene thinning liquid, and a fluorocarbon solution wetting agent;

(b) depositing on the rubbing contact surface a multiplicity of subcoats of said mixture to form a multilayered lubrication coating thereon, (c) individually curing each successive subcoat at an initial curing temperature;

(d) deroughening the surfaces of only some of the cured subcoats mutually spaced apart by predetermined thickness intervals of said multilayered coating; and (e) curing said multilayered coating at a final curing temperature substantially higher than said initial curing temperature.

19. The method of claim 18 further comprising the step of (f) applying a thin layer of dry lubricant material to the surface of the cured multilayered coating.

20. The method of claim 19 wherein said step (f) is performed by burnishing a small amount of CFx powder into the surface of the cured multilayered coating.

21. The method of claim 20 wherein said step (d) includes deroughening the surface of the last-applied subcoat and wherein said step (f) is performed prior to such deroughening.

22. The method of claim 18 wherein said step (e) is performed by curing said multilayered coating at a final curing temperature between approximately 650° F. and 750° F.

23. The method of claim 18 wherein said step (e) is performed by exposing the multilayered coating to a temperature of approximately 212° F., gradually elevating the temperature to said final curing temperature, and then curing said multilayered coating at said final curing temperature for a predetermined period of time.

24. The method of claim 23 wherein said step (e) includes elevating said temperature to a final curing temperature between approximately 650° F. and 750° F. and then curing said multilayered coating at said final curing temperature for approximately one hour.

25. The method of claim 18 wherein said step (d) is performed by deroughening the surfaces of subcoats spaced apart by thickness intervals equal to approximately one third the thickness of said multilayered coating.

26. The method of claim 25 wherein said step (b) is performed by depositing approximately nine subcoats of said mixture on the rubbing contact surface.

27. A foil bearing foil element having a rubbing contact surface coated with a dry lubricant film applied thereto in accordance with the method of claim 18, 19, 20, 21, 22, 23, 24, 25 or 26.

28. A method of making a coated foil element for use in a high speed foil bearing, said method comprising the steps of:
 (a) providing a compliant foil element having a rubbing contact surface;
 (b) providing a coating mixture comprising graphite fluoride powder and polyimide varnish;
 (c) applying a predetermined number of coating subsets of said mixture to said rubbing contact surface to form thereon a multilayered lubricant coating;
 (d) curing each successive mixture subcoat in each of said coating subsets at a first curing temperature to individually solidify each of the subcoats;
 (e) deroughening the surface of each of said coating subsets;
 (f) curing said multilayered coating at a second curing temperature substantially higher than said first curing temperature; and
 (g) burnishing graphite fluoride into the surface of the last-applied coating subset.

29. A coated foil element made by the method of claim 28.

* * * * *